(12) United States Patent
Miyata et al.

(10) Patent No.: US 7,273,317 B2
(45) Date of Patent: Sep. 25, 2007

(54) THRUST SLIDING BEARING

(75) Inventors: Kazuyuki Miyata, Fujisawa (JP); Ryohei Kaneko, Fujisawa (JP)

(73) Assignee: Oiles Corporation, Tokyo (JP)

( * ) Notice: Subject to any disclaimer, the term of this patent is extended or adjusted under 35 U.S.C. 154(b) by 162 days.

(21) Appl. No.: 10/542,534

(22) PCT Filed: Feb. 5, 2004

(86) PCT No.: PCT/JP2004/001184

§ 371 (c)(1), (2), (4) Date: Jul. 18, 2005

(87) PCT Pub. No.: WO2004/070220

PCT Pub. Date: Aug. 19, 2004

(65) Prior Publication Data

US 2006/0140523 A1    Jun. 29, 2006

(30) Foreign Application Priority Data

Feb. 7, 2003    (JP) ............................. 2003-030944

(51) Int. Cl.
*F16C 17/04*    (2006.01)

(52) U.S. Cl. .................................... 384/420

(58) Field of Classification Search ............. 384/420, 384/424, 425, 426, 427
See application file for complete search history.

(56) References Cited

U.S. PATENT DOCUMENTS

| 4,239,301 A | 12/1980 | Pannwitz |
| 4,854,745 A | 8/1989 | Kamimura et al. |
| 4,907,289 A | 3/1990 | Kamimura et al. |
| 4,923,312 A | 5/1990 | Kamimura et al. |
| 4,969,752 A | 11/1990 | Kubota et al. |

FOREIGN PATENT DOCUMENTS

| EP | 1 365 162 A1 | 11/2003 |
| EP | 1365162 A1 | 11/2003 |
| JP | 1-141926 | 9/1989 |
| JP | 2002-257146 A | 9/2002 |

OTHER PUBLICATIONS

International Search Report of PCT/JP2004/001184, mailed May 25, 2004.

*Primary Examiner*—Lenard A. Footland
(74) *Attorney, Agent, or Firm*—Nixon & Vanderhye P.C.

(57) ABSTRACT

A thrust sliding bearing (1) includes an upper casing (3) having an annular surface (2); an annular lower casing (5) which is superposed on the upper casing (3) so as to be rotatable about an axis (0) of the upper casing (3) and has an annular surface (4) opposed to the annular surface (2) of the upper casing (3); and an annular thrust sliding bearing piece (6) and an elastic ring (7) which are superposed on top of each other and are interposed between the annular surfaces (2) and (4).

15 Claims, 4 Drawing Sheets

THRUST SLIDING BEARING

This application is the US national phase of international application PCT/JP2004/001184, filed 5 Feb. 2004, which designated the U.S. and claims benefit of JP 2003-030944, dated 7 Feb. 2003, the entire contents of each of which are hereby incorporated by reference.

TECHNICAL FIELD

The present invention relates to a thrust sliding bearing, and more particularly to a thrust sliding bearing which is suitably incorporated as a thrust sliding bearing of a strut-type suspension (Macpherson type) in a four-wheeled vehicle.

BACKGROUND ART

In general, a strut-type suspension is mainly used in a front wheel of a four-wheeled vehicle, and is constructed such that a strut assembly incorporating a hydraulic shock absorber in a cylinder formed integrally with a main shaft is combined with a coil spring. Among such suspensions, there is a type of structure in which the axis of the coil spring is actively offset with respect to the axis of the strut, so as to allow the sliding of a piston rod of the shock absorber incorporated in the strut to be effected smoothly. There is another type of structure in which the coil spring is disposed by aligning the axis of the coil spring with the axis of the strut. In either structure, a thrust bearing is disposed between a mounting member of a vehicle body and an upper spring seat of the coil spring to allow the rotation to be effected smoothly when the strut assembly rotates together with the coil spring by the steering operation.

In this thrust bearing, a rolling bearing using balls or needles or a synthetic resin-made sliding bearing is used. However, the rolling bearing has a possibility that fatigue failure occurs in the balls or needles due to fine vibrations and vibration load or the like, and there is a problem in that it is difficult to maintain smooth steering operation. The sliding bearing has problems in that since its friction torque is high as compared with the rolling bearing, an increase in the thrust load results in an increase in the friction torque, which renders the steering operation heavy, and that, depending on a combination of synthetic resins, the stick-slip phenomenon occurs, frequently producing frictional noise attributable to the stick-slip phenomenon.

In addition, a lubricant such as grease is applied to the sliding bearing, and the above-described frictional noise practically does not occur insofar as such a lubricant is present, as desired, on the sliding surface. However, there can be cases where the frictional noise begins to be produced due to the dissipation or the like of the lubricant over long periods of use.

It should be noted that the above-described problems do not necessarily occur only in the thrust sliding bearing incorporated in the strut-type suspension, but can similarly occur in general thrust sliding bearings.

DISCLOSURE OF THE INVENTION

The present invention has been devised in view of the above-described aspects, and its object is to provide a thrust sliding bearing which makes it possible to allow a lubricant such as grease to be present on the sliding surface over long periods of time and use such a lubricant for receiving the thrust load, in which even if the thrust load increases, the friction torque practically does not change to make it possible to form the sliding surface with a low friction torque and maintain such a low coefficient of friction over long periods of use, which is free of the occurrence of frictional noise at the sliding surface, and which, when incorporated into the strut-type suspension as a thrust sliding bearing, makes it possible to ensure smooth steering operation equivalent to that of the rolling bearing, and is capable of improving the riding comfort.

A thrust sliding bearing in accordance with a first aspect of the invention comprises: a first bearing body having an annular surface; a second bearing body which is superposed on the first bearing body so as to be rotatable about an axis of the first bearing body, and has an annular surface opposed to the annular surface of the first bearing body; and an annular thrust sliding bearing piece and an elastic ring superposed on top of each other and interposed between the annular surfaces, wherein the thrust sliding bearing piece has an annular plate portion and at least two annular projecting portions which are integrally formed on one surface of the annular plate portion and are brought into contact with the annular surface of the first bearing body slidably with respect to the annular surface so as to form a hermetically sealed annular space in cooperation with the annular surface, and the elastic ring is interposed between the thrust sliding bearing piece and the second bearing body in contact with another surface of the annular plate portion and the annular surface of the second bearing body, a lubricant being filled in the hermetically sealed annular space.

According to the thrust sliding bearing in accordance with the first aspect, since a lubricant is hermetically filled in the hermetically sealed annular space formed by two annular projecting portions, the lubricant can be supplied only in a required very small amount to the sliding surfaces between the annular surface of the first bearing body and the two annular projecting portions. Moreover, since the arrangement provided is such that the thrust load is also received by the lubricant in the hermetically sealed annular space, the surface of the lubricant in contact with the annular surface of the first bearing body also serves as a sliding surface in the rotation of the second bearing body relative to the first bearing body. Thus, the sliding surfaces can be formed with an even lower friction torque, so that the occurrence of frictional noise at the sliding surfaces can be eliminated, and smooth steering operation equivalent to that of the rolling bearing can be ensured. Moreover, even if an unbalanced load is applied to the two annular projecting portions, the elastic ring is caused in advance to undergo elastic deformation so as to make its thickness small, thereby preventing the occurrence of flexural deformation in the two annular projecting portions. It is thus possible to effectively prevent the leakage of the lubricant from the hermetically sealed annular space to the outside ascribable to the reduction in the volume of the hermetically sealed annular space due to the flexural deformation of the two annular projecting portions. As a result, it is possible to maintain the lubricant disposed in the hermetically sealed annular space over long periods of time, and supply only a very small amount of the lubricant maintained in the hermetically sealed annular space to the sliding surfaces between the annular surface of the first bearing body and the two annular projecting portions, thereby allowing the lubricant to be present at the sliding surfaces stably over long periods of time. Thus, in conjunction with the above-described action, even if the thrust load has become large, the friction torque remains practically unchanged, and the sliding surfaces can be formed with a low friction torque. Moreover, it is possible to improve the riding comfort since the impact applied to the first or second bearing body is transmitted to the second or first bearing body by being damped by the resiliency of the elastic ring.

As in the thrust sliding bearing in accordance with a second aspect of the invention, the thrust sliding bearing piece preferably further has at least two other annular projecting portions formed integrally on another surface of the annular plate portion. In this case, the elastic ring is disposed between the two other annular projecting portions in a radial direction. According to the thrust sliding bearing in accordance with the above-described aspect, the elastic ring can be constantly positioned in proper position with respect to the thrust sliding bearing piece, and it is possible to constantly maintain the mutual proper superposition of the thrust sliding bearing piece and the elastic ring.

In the present invention, as in the thrust sliding bearing in accordance with a third aspect of the invention, the thrust sliding bearing piece may have at least one intermediate annular projecting portion which is integrally formed on the one surface of the annular plate portion between the two annular projecting portions in the radial direction and is brought into contact with the annular surface of the first bearing body slidably with respect to the annular surface so as to form a plurality of mutually separated split hermetically sealed annular spaces in cooperation with the annular surface and the two annular projecting portions by splitting the hermetically sealed annular space. The thrust load is received in a distributed manner by such an intermediate annular projecting portion as well. As a result, it is possible to further reliably obviate the occurrence of the flexural deformation of the two annular projecting portions. Moreover, even if the lubricant filled in one of the split hermetically sealed annular space has leaked out in a large amount, this leakage is prevented from affecting the other split hermetically sealed annular space, and the above-described action can be allowed to take place in the remaining other split hermetically sealed annular space, so that the thrust sliding bearing becomes fail-safe.

As in the thrust sliding bearing in accordance with a fourth aspect of the invention, the elastic ring may preferably be formed of natural rubber, synthetic rubber, or a thermoplastic elastomer. The cross-sectional shape of the elastic ring may be formed in a substantially rectangular shape or a substantially elongated elliptical shape.

The lubricant may preferably fill the hermetically sealed annular space without a gap under a thrust load as in the thrust sliding bearing in accordance with a fifth aspect of the invention, or may fill the hermetically sealed annular space without a gap under no thrust load, depending on a case, as in the thrust sliding bearing in accordance with a sixth aspect of the invention.

The lubricant includes at least one of grease and lubricating oil as in the thrust sliding bearing in accordance with a seventh aspect of the invention. Preferably, the lubricant is constituted by silicone-based grease as in the thrust sliding bearing in accordance with an eighth aspect of the invention.

In the thrust sliding bearing in accordance with the invention, both bearing bodies and the thrust sliding bearing piece are preferably formed of synthetic resin. In particular, the synthetic resin constituting the thrust sliding bearing piece which is accommodated between both bearing bodies should preferably possess self-lubricity, and the synthetic resin constituting both bearing bodies should preferably excel in the sliding characteristics such as wear resistance, impact resistance, and creep resistance as well as in mechanical characteristics such as rigidity. Specifically, as in the thrust sliding bearing in accordance with a ninth aspect of the invention, both of the bearing bodies may be formed of a synthetic resin including at least one of polyacetal resin, polyamide resin, thermoplastic polyester resin, polyolefin resin, polycarbonate resin, and fluororesin. Alternatively, as in the thrust sliding bearing in accordance with a 10th aspect of the invention, the thrust sliding bearing piece may be formed of a synthetic resin including at least one of polyacetal resin, polyamide resin, thermoplastic polyester resin, polyolefin resin, and fluororesin. As for both bearing bodies, a synthetic resin similar to the synthetic resin constituting the thrust sliding bearing piece can be used, but particularly a synthetic resin which exhibits preferable friction characteristics when combined with the synthetic resin used for the thrust sliding bearing piece. To illustrate examples of desirable combination of resins, it is possible to cite the following combinations for the thrust sliding bearing piece and both bearing bodies: a combination of polyacetal resin and polyamide resin; a combination of a polyolefin resin, particularly polyethylene resin, and polyacetal resin; a combination of polyacetal resin and a thermoplastic polyester resin, particularly polybutylene terephthalate resin; and a combination of polyacetal resin and polyacetal resin.

In the thrust sliding bearing in accordance with the invention, as in the thrust sliding bearing in accordance with its 11th aspect, the first bearing body at a radially outer peripheral edge portion thereof is preferably adapted to be resiliently fitted to the second bearing body at a radially outer peripheral edge portion of the second bearing body. In addition, as in the thrust sliding bearing in accordance with a 12th aspect of the invention, a labyrinth is preferably formed between the bearing bodies in at least one of the outer peripheral edge portions and inner peripheral edge portions, as viewed in a radial direction, of both of the bearing bodies. By virtue of such a labyrinth, it becomes possible to satisfactorily prevent the entry of dust, muddy water, and the like into the space between the first and second bearing bodies with the thrust sliding bearing piece and the elastic ring fitted therebetween.

In the sliding bearing in accordance with a 13th aspect of the invention, the second bearing body has large- and small-diameter annular projections formed integrally on the annular surface thereof, and the thrust sliding bearing piece and the elastic ring are disposed radially inwardly of the large-diameter annular projection and radially outwardly of the small-diameter annular projection. The thrust sliding bearing piece and the elastic ring can be positioned with respect to the radial direction by means of such a pair of annular projections. Moreover, since the thrust sliding bearing piece at its radially inner peripheral surface and outer peripheral surface is slidably brought into contact with the annular projections, respectively, as in the thrust sliding bearing in accordance with a 14th aspect of the invention, it is possible to prevent the deflection of the thrust sliding bearing piece under the thrust load.

According to the present invention, it is possible to provide a thrust sliding bearing which makes it possible to allow a lubricant such as grease to be present on the sliding surface over long periods of time and use such a lubricant for receiving the thrust load, in which even if the thrust load increases, the friction torque practically does not change to make it possible to form the sliding surface with a low friction torque and maintain such a low coefficient of friction over long periods of use, which is free of the occurrence of frictional noise at the sliding surface, and which, when incorporated into the strut-type suspension as a thrust sliding bearing, makes it possible to ensure smooth steering operation equivalent to that of the rolling bearing, and is capable of improving the riding comfort.

Hereafter, a description will be given of the present invention and the mode for carrying out the invention with reference to the preferred embodiments shown in the drawings. It should be noted that the present invention is not limited to these embodiments.

BEST MODE FOR CARRYING OUT THE INVENTION

Figure 1:
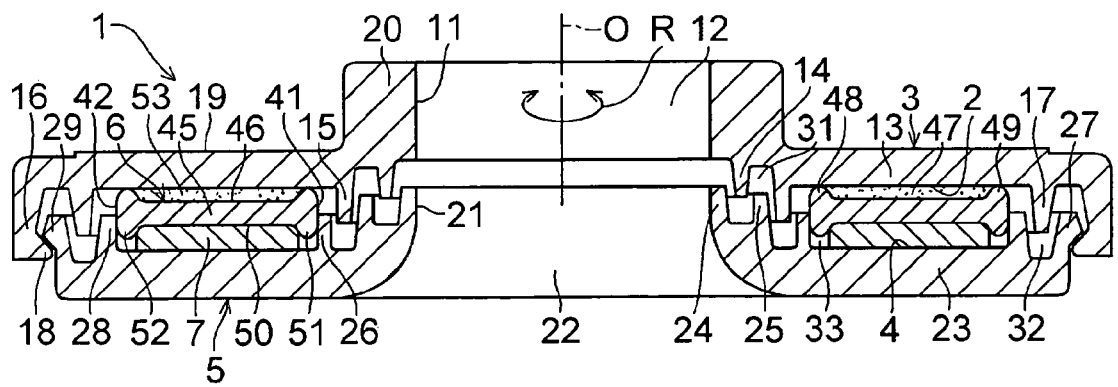
FIG. 1 is a cross-sectional view of a preferred embodiment of the invention.
Figure 2:
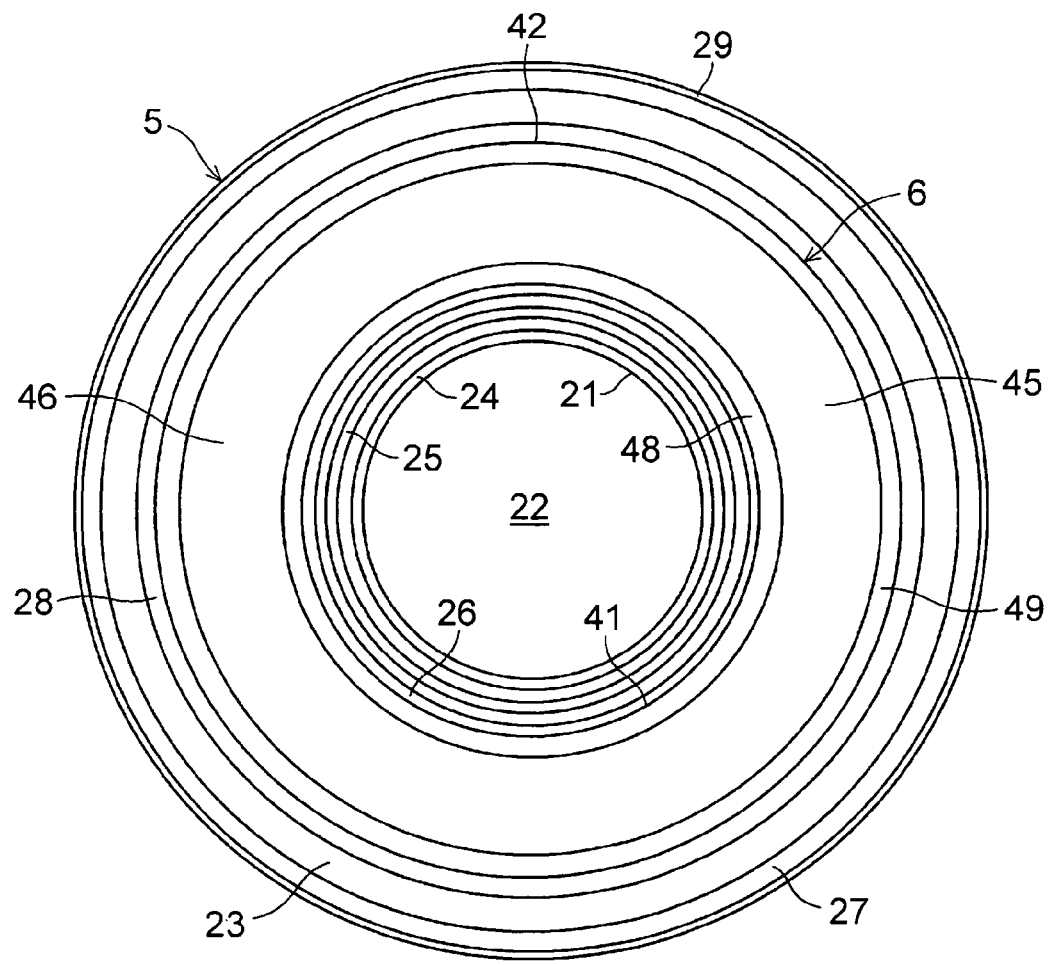
FIG. 2 is a plan view of a lower casing and a thrust sliding bearing piece in accordance with the embodiment shown in FIG. 1.
Figure 3:
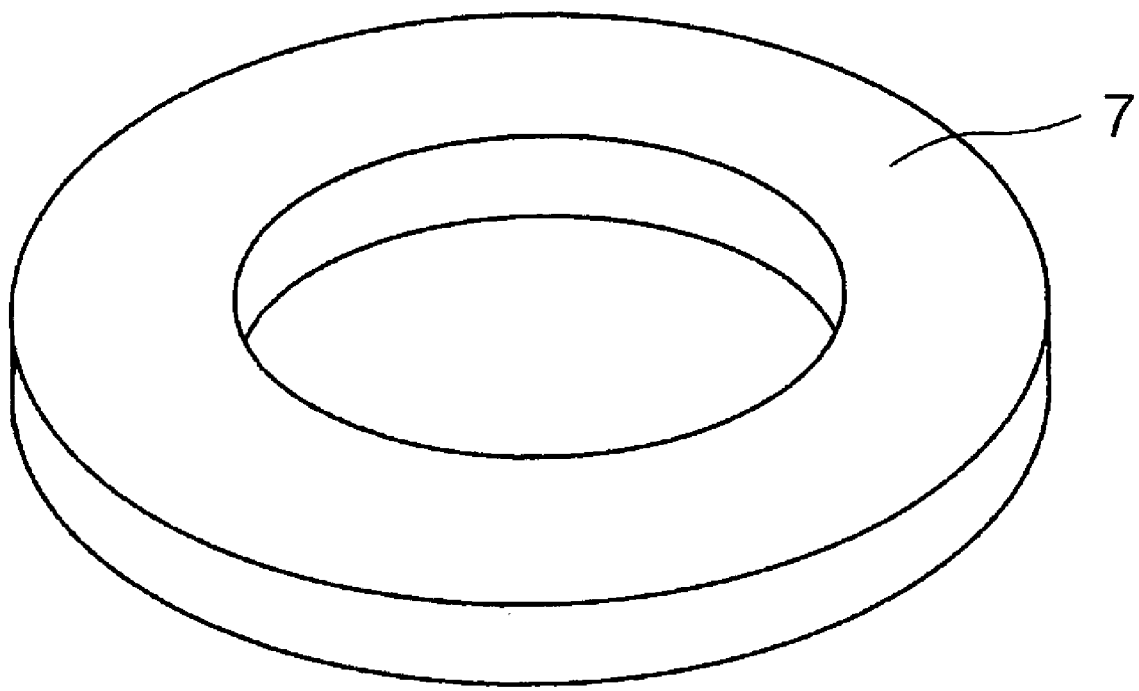
FIG. 3 is a perspective view of an elastic ring of the embodiment shown in FIG. 1.

In FIGS. 1 to 3, a thrust sliding bearing 1 for use in a strut-type suspension in a four-wheeled vehicle in accordance with this embodiment is comprised of an upper casing 3 which is made of a synthetic resin such as polyacetal resin, has an annular surface 2, and serves as a first bearing body; an annular lower casing 5 which is made of a synthetic resin such as polyacetal resin, is superposed on the upper casing 3 so as to be rotatable about an axis O of the upper casing 3 in an R direction, has an annular surface 4 opposed to the annular surface 2 of the upper casing 3, and serves as a second bearing body; and a thrust sliding bearing piece 6 and an elastic ring 7 which are superposed on top of each other and are interposed between the annular surfaces 2 and 4.

The annular upper casing 3 having a through hole 12 defined by an inner peripheral surface 11 includes an annular upper casing body portion 13 having the annular surface 2; an innermost peripheral-side cylindrical suspended portion 14 formed integrally with the annular surface 2 of the upper casing body portion 13 and suspended toward the lower casing 5; an inner peripheral-side cylindrical suspended portion 15 disposed radially outwardly of the innermost peripheral-side cylindrical suspended portion 14, formed integrally with the annular surface 2, and suspended toward the lower casing 5; a cylindrical suspended engaging portion 16 formed integrally with a radially outer peripheral edge of the upper casing body portion 13; an outer peripheral-side cylindrical suspended portion 17 disposed radially inwardly of the cylindrical suspended engaging portion 16 and radially outwardly of the inner peripheral-side cylindrical suspended portion 15, and formed integrally with the annular surface 2; an engaging hook portion 18 formed on a radially inner peripheral surface of the cylindrical suspended engaging portion 16; and a cylindrical portion 20 formed integrally with an outer surface 19 of the upper casing body portion 13 on the radially inner peripheral side of the upper casing body portion 13.

The annular lower casing 5 having a through hole 22, which is concentric with and of the same diameter as the through hole 12 and is defined by an inner peripheral surface 21, is integrally formed by including an annular lower casing body portion 23 having the annular surface 4; an innermost peripheral-side cylindrical protruding portion 24 formed integrally with a radially inner peripheral edge of the lower casing body portion 23 and protruding toward the upper casing 3 so as to be disposed radially inwardly of the innermost peripheral-side cylindrical suspended portion 14; an inner peripheral-side cylindrical protruding portion 25 disposed radially outwardly of the innermost peripheral-side cylindrical protruding portion 24, formed integrally with the annular surface 4, and protruding toward the upper casing 3 so as to be disposed between the innermost peripheral-side cylindrical suspended portion 14 and the inner peripheral-side cylindrical suspended portion 15; a small-diameter annular projection 26 disposed radially outwardly of the inner peripheral-side cylindrical protruding portion 25, formed integrally with the annular surface 4, and protruding toward the upper casing 3 so as to be disposed radially outwardly of the inner peripheral-side cylindrical suspended portion 15; a cylindrical protruding engaging portion 27 formed integrally with a radially outer peripheral edge of the lower casing body portion 23 and protruding toward the upper casing 3 so as to be disposed between the cylindrical suspended engaging portion 16 and the outer peripheral-side cylindrical suspended portion 17; an annular projection 28 disposed radially inwardly of the cylindrical protruding engaging portion 27 and radially outwardly of the annular projection 26, formed integrally with the annular surface 4, protruding toward the upper casing 3 so as to be disposed radially inwardly of the outer peripheral-side cylindrical suspended portion 17, and having larger diameter than that of the annular projection 26; and an engaging hook portion 29 formed on a radial outer peripheral surface of the cylindrical protruding engaging portion 27 and adapted to engage the engaging hook portion 18.

The upper casing 3 at the engaging hook portion 18 of the cylindrical suspended engaging portion 16 of its radially outer peripheral edge portion is adapted to be resiliently fitted and secured to the lower casing 5 by being resiliently engaged in a snap-fit fashion with the engaging hook portion 29 of the cylindrical protruding engaging portion 27 of the radially outer peripheral edge portion in the lower casing 5.

In at least one portions of the radially outer peripheral portions and inner peripheral portions of the upper casing 3 and the lower casing 5, i.e., both peripheral portions in this embodiment, a labyrinth 31 is arranged to be formed between the upper casing 3 and the lower casing 5 by the upper casing body portion 13, the innermost peripheral-side cylindrical suspended portion 14, and the inner peripheral-side cylindrical suspended portion 15, as well as the lower casing body portion 23, the innermost peripheral-side cylindrical protruding portion 24, the inner peripheral-side cylindrical protruding portion 25, and annular projection 26. Further, a labyrinth 32 is arranged to be formed by the upper casing body portion 13, the cylindrical suspended engaging portion 16, and the outer peripheral-side cylindrical suspended portion 17, as well as the lower casing body portion 23, the cylindrical protruding engaging portion 27, and the annular projection 28. Entry of dust, muddy water, and the like from the outside into an annular space 33, where the thrust sliding bearing piece 6 and the elastic ring 7 are fitted between the upper casing body portion 13 and the lower casing body portion 23, is prevented by such a labyrinth 31 at the inner peripheral edge portion and such a labyrinth 32 at the outer peripheral edge portion.

The thrust sliding bearing piece 6 made of a synthetic resin such as polyacetal resin is disposed radially inwardly of the annular projection 28 and radially outwardly of the annular projection 26 such that its annular radially inner peripheral surface 41 and outer peripheral surface 42 are slidably brought into contact with the annular projections 26 and 28, respectively.

The thrust sliding bearing piece 6 includes an annular plate portion 45; concentric small- and large-diameter annular projecting portions 48 and 49 which are integrally formed on one surface 46 of the annular plate portion 45 in such a manner as to be radially spaced apart, and are brought into contact with the annular surface 2 of the upper casing 3 slidably with respect to the annular surface 2 so as to form a hermetically sealed annular space 47 in cooperation with the annular surface 2; and concentric small- and large-diameter annular projecting portions 51 and 52 which are integrally formed on the other surface 50 of the annular plate portion 45 in such a manner as to be radially spaced apart. A lubricant 53 constituted by silicone-based grease is filled in the hermetically closed space 47.

The lubricant 53 is filled in the hermetically sealed annular space 47 in an amount for filling the hermetically sealed annular space 47 without a gap under no thrust load. Such an amount of lubricant becomes such as to fill the hermetically sealed annular space 47 without a gap even under a thrust load. The lubricant 53 filled in the hermetically sealed annular space 47 without a gap is, together with the annular projecting portions 48 and 49, adapted to receive the thrust load by coming into contact with the annular surface 4.

The elastic ring 7 having a substantially rectangular cross section and formed of natural rubber, synthetic rubber, or a thermoplastic elastomer is interposed between the thrust sliding bearing piece 6 and the lower casing 5 in contact with the surface 50 of the annular plate portion 45 and the annular surface 4, and is disposed between the annular projecting portions 51 and 52 in the radial direction. Moreover, the elastic ring 7 is disposed radially outwardly of the annular projection 26 and radially inwardly of the annular projection 28. Under a thrust load, such an elastic ring 7 is adapted to make its thickness small by becoming flexurally deformed.

Figure 4:
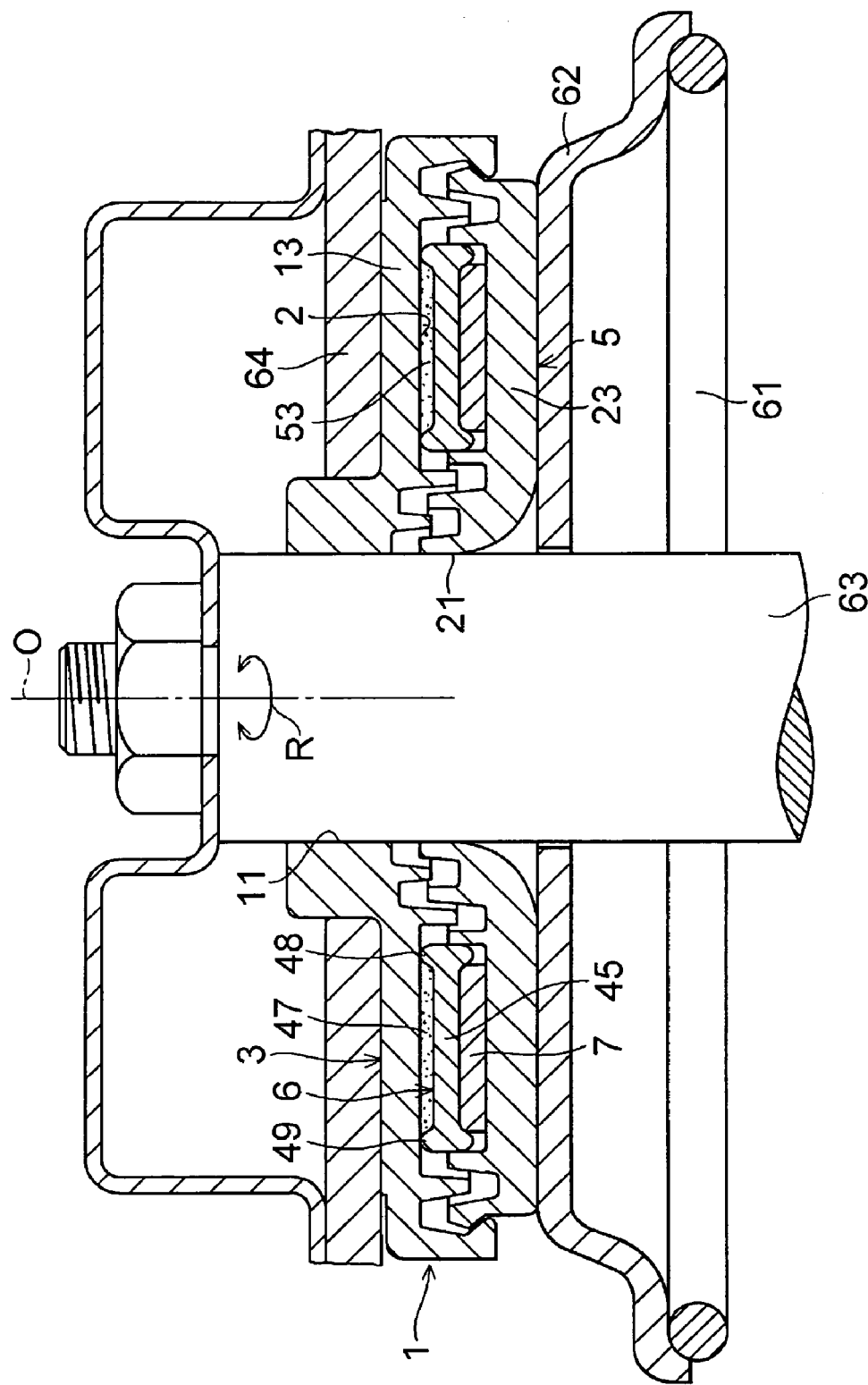
FIG. 4 is an explanatory diagram of an example in which the embodiment shown in FIG. 1 is incorporated in a strut-type suspension.

The above-described thrust sliding bearing 1 is used by being fitted between an upper spring seat 62 of a coil spring 61 in a strut-type suspension assembly on the one hand, and a mounting member 64 on the vehicle body side to which a piston rod 63 of a hydraulic damper is secured on the other hand, as shown in FIG. 4. In this case, an upper portion of the piston rod 63 is inserted in the through holes 12 and 22 so as to be rotatable about the axis O in the R direction with respect to the upper casing 3 and the lower casing 5.

In the strut-type suspension assembly installed by means of the thrust sliding bearing 1, as shown in FIG. 4, at the time of the steering operation, the relative rotation of the upper spring seat 62 about the axis O in the R direction by means of the coil spring 61 is smoothly effected by the relative rotation in the same direction of the sliding surfaces between the annular surface 2 of the upper casing 3 on the one hand, and the annular projecting potions 48 and 49 and the lubricant 53 on the other hand.

According to the thrust sliding bearing 1, since the lubricant 53 is hermetically filled in the hermetically sealed annular space 47 formed by the annular projecting portions 48 and 49, the lubricant 53 can be supplied only in a required very small amount to the sliding surfaces between the annular surface 2 and the annular projecting portions 48 and 49. Moreover, since the arrangement provided is such that the thrust load is also received by the lubricant 53 in the hermetically sealed annular space 47, the surface of the lubricant 53 in contact with the annular surface 2 also serves as a sliding surface in the rotation in the R direction of the lower casing 5 relative to the upper casing 3. Thus, the sliding surfaces can be formed with an even lower friction torque, so that the occurrence of frictional noise at the sliding surfaces can be eliminated, and smooth steering operation equivalent to that of the rolling bearing can be ensured. Moreover, even if an unbalanced load is applied to the annular projecting portions 48 and 49, the elastic ring 7 is caused in advance to undergo elastic deformation so as to make its thickness small, thereby preventing the occurrence of flexural deformation in the annular projecting portions 48 and 49. It is thus possible to effectively prevent the leakage of the lubricant 53 from the hermetically sealed annular space 47 to the outside ascribable to the reduction in the volume of the hermetically sealed annular space 47 due to the flexural deformation of the annular projecting portions 48 and 49. As a result, it is possible to maintain the lubricant 53 disposed in the hermetically sealed annular space over long periods of time, and constantly supply only a very small amount of the lubricant 53 hermetically maintained in the hermetically sealed annular space 47 to the sliding surfaces between the annular surface 2 and the annular projecting portions 48 and 49, thereby allowing the lubricant 53 to be present at the sliding surfaces stably over long periods of time. Thus, in conjunction with the above-described action, even if the thrust load has become large, the friction torque remains practically unchanged, and the sliding surfaces can be formed with a low friction torque. Moreover, it is possible to improve the riding comfort of the vehicle occupant since the impact applied from the coil spring 61 to the lower casing 5 is transmitted to the upper casing 3 by being damped by the resiliency of the elastic ring 7.

In addition, according to the thrust sliding bearing 1, since the elastic ring 7 is disposed between the annular projecting portions 51 and 52 in the radial direction, the elastic ring 7 can be constantly positioned in proper position with respect to the thrust sliding bearing piece 6, and it is possible to constantly maintain the mutual proper superposition of the thrust sliding bearing piece 6 and the elastic ring 7. Moreover, since the thrust sliding bearing piece 6 and the elastic ring 7 are disposed radially outwardly of the annular projection 26 and radially inwardly of the annular projection 28, the thrust sliding bearing piece 6 and the elastic ring 7 can be positioned with respect to the radial direction by means of such a pair of annular projections 28 and 26. Moreover, since the thrust sliding bearing piece 6 at its radially inner peripheral surface 41 and outer peripheral surface 42 is slidably brought into contact with the annular projections 26 and 28, respectively, it is possible to prevent the deflection of the thrust sliding bearing piece 6 under the thrust load.

Figure 5:
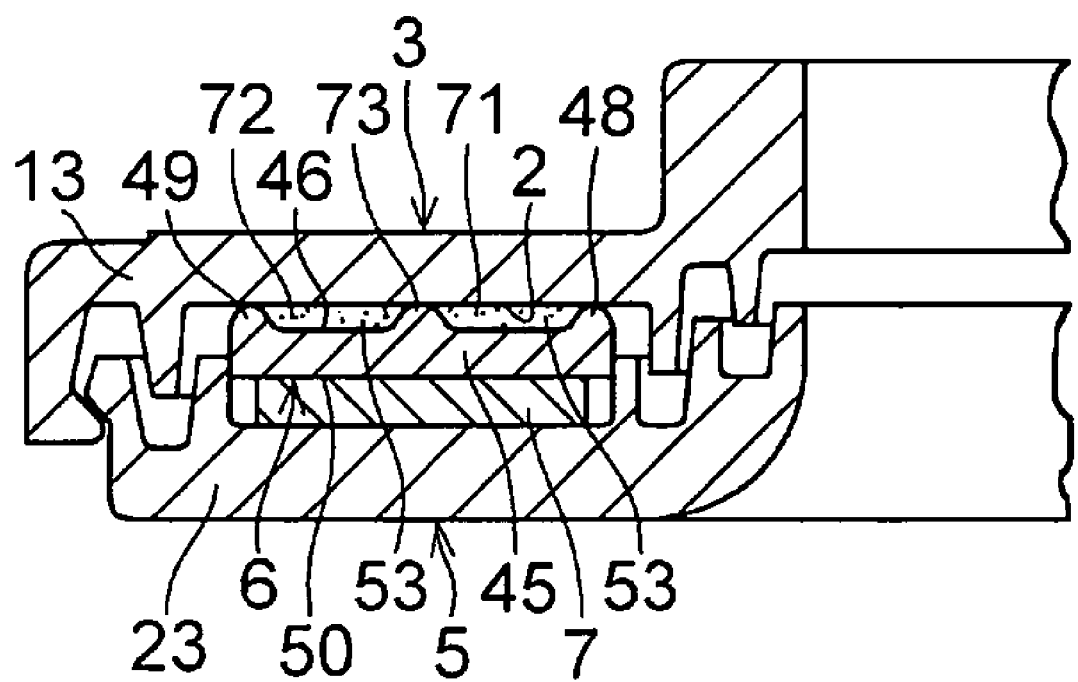
FIG. 5 is a fragmentary cross-sectional view of another preferred embodiment of the invention.

Incidentally, although in the above-described thrust sliding bearing 1 the thrust sliding bearing piece 6 is used which is provided with the annular projecting portions 51 and 52 on the surface 50 of the annular plate portion 45, it is possible to alternatively use the thrust sliding bearing piece 6 which is not provided with the annular projecting portions 51 and 52 on the surface 50, as shown in FIG. 5. Furthermore, the thrust sliding bearing piece 6 may be formed by including, in addition to the annular projecting portions 48 and 49, an intermediate annular projecting portion 73 which is integrally formed on the surface 46 of the annular plate portion 45 between the annular projecting portions 48 and 49 in the radial direction and is brought into contact with the annular surface 2 of the upper casing 3 slidably with respect to the annular surface 2 so as to form a plurality of (in this embodiment, two) mutually separated and concentric split hermetically sealed annular spaces 71 and 72 in cooperation with the annular surface 2 and the annular projecting portions 48 and 49 by splitting the hermetically sealed annular space 47. In this case as well, it suffices if the lubricant 53 is filled in the respective split hermetically sealed annular spaces 71 and 72 without a gap in the same way as described above.

In the thrust sliding bearing 1 shown in FIG. 5, the thrust load is received in a distributed manner by the intermediate annular projecting portion 73 as well. As a result, it is possible to further reliably obviate the occurrence of the flexural deformation of the annular projecting portions 48 and 49. Moreover, even if the lubricant 53 filled in one of the split hermetically sealed annular space 71 and 72 has leaked out in a large amount, this leakage is prevented from affecting the other split hermetically sealed annular space, and the above-described action can be allowed to take place in the remaining other split hermetically sealed annular space, so that the thrust sliding bearing 1 becomes fail-safe.

The invention claimed is:

1. A thrust sliding bearing comprising:
   a first bearing body having an annular surface;
   a second bearing body which is superposed on said first bearing body so as to be rotatable about an axis of said first bearing body, and has an annular surface opposed to the annular surface of said first bearing body; and
   an annular thrust sliding bearing piece and an elastic ring superposed on top of each other and interposed between the annular surfaces,
   wherein said thrust sliding bearing piece has an annular plate portion and at least two annular projecting portions which are integrally formed on one surface of said annular plate portion and are brought into contact with the annular surface of said first bearing body slidably with respect to said annular surface so as to form a hermetically sealed annular space in cooperation with said annular surface, and said elastic ring is interposed between said thrust sliding bearing piece and said second bearing body in contact with another surface of said annular plate portion and the annular surface of said second bearing body, a lubricant being filled in the hermetically sealed annular space.

2. The thrust sliding bearing according to claim 1, wherein said thrust sliding bearing piece further has at least two other annular projecting portions formed integrally on another surface of said annular plate portion, wherein said elastic ring is disposed between said two other annular projecting portions in a radial direction.

3. The thrust sliding bearing according to claim 1, wherein said thrust sliding bearing piece has at least one intermediate annular projecting portion which is integrally formed on the one surface of said annular plate portion between said two annular projecting portions in the radial direction and is brought into contact with the annular surface of said first bearing body slidably with respect to said annular surface so as to form a plurality of mutually separated split hermetically sealed annular spaces in cooperation with said annular surface and said two annular projecting portions by splitting said hermetically sealed annular space.

4. The thrust sliding bearing according to claim 1, wherein said elastic ring is formed of natural rubber, synthetic rubber, or a thermoplastic elastomer.

5. The thrust sliding bearing according to claim 1, wherein the lubricant fills said hermetically sealed annular space without a gap under a thrust load.

6. The thrust sliding bearing according to claim 1, wherein the lubricant fills said hermetically sealed annular space without a gap under no thrust load.

7. The thrust sliding bearing according to claim 1, wherein the lubricant includes at least one of grease and lubricating oil.

8. The thrust sliding bearing according to claim 1, wherein the lubricant is constituted by silicone-based grease.

9. The thrust sliding bearing according to claim 1, wherein both of said bearing bodies are formed of a synthetic resin including at least one of polyacetal resin, polyamide resin, thermoplastic polyester resin, polyolefin resin, polycarbonate resin, and fluororesin.

10. The thrust sliding bearing according to claim 1, wherein said thrust sliding bearing piece is formed of a synthetic resin including at least one of polyacetal resin, polyamide resin, thermoplastic polyester resin, polyolefin resin, and fluororesin.

11. The thrust sliding bearing according to claim 1, wherein said first bearing body at a radially outer peripheral edge portion thereof is adapted to be resiliently fitted to said second bearing body at a radially outer peripheral edge portion of said second bearing body.

12. The thrust sliding bearing according to claim 1, wherein a labyrinth is formed between said bearing bodies in at least one of the outer peripheral edge portions and inner peripheral edge portions, as viewed in a radial direction, of both of said bearing bodies.

13. The thrust sliding bearing according to claim 1, wherein said second bearing body has large- and small-diameter annular projections formed integrally on the annular surface thereof, and said thrust sliding bearing piece and said elastic ring are disposed radially inwardly of said large-diameter annular projection and radially outwardly of said small-diameter annular projection.

14. The thrust sliding bearing according to claim 13, wherein said thrust sliding bearing piece at radially outer and inner peripheral surfaces thereof is slidably brought into contact with said large- and small-diameter annular projections, respectively.

15. The thrust sliding bearing according to claim 1 for use in a strut-type suspension in a four-wheeled vehicle.

* * * * *